Sept. 17, 1963   P. J. GARDNER   3,103,815
LEVEL GAGES
Filed July 13, 1961
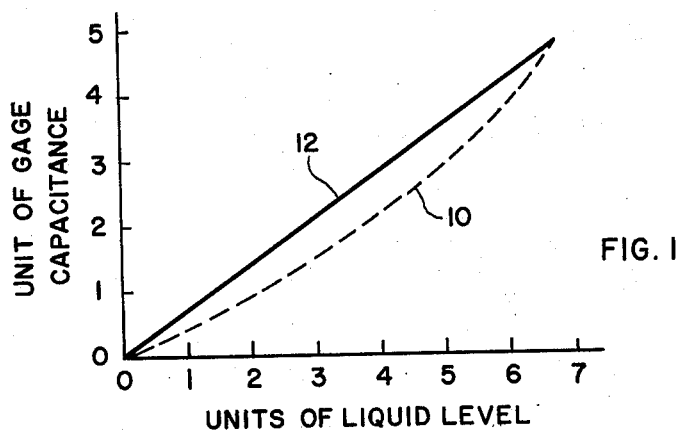
FIG. 1
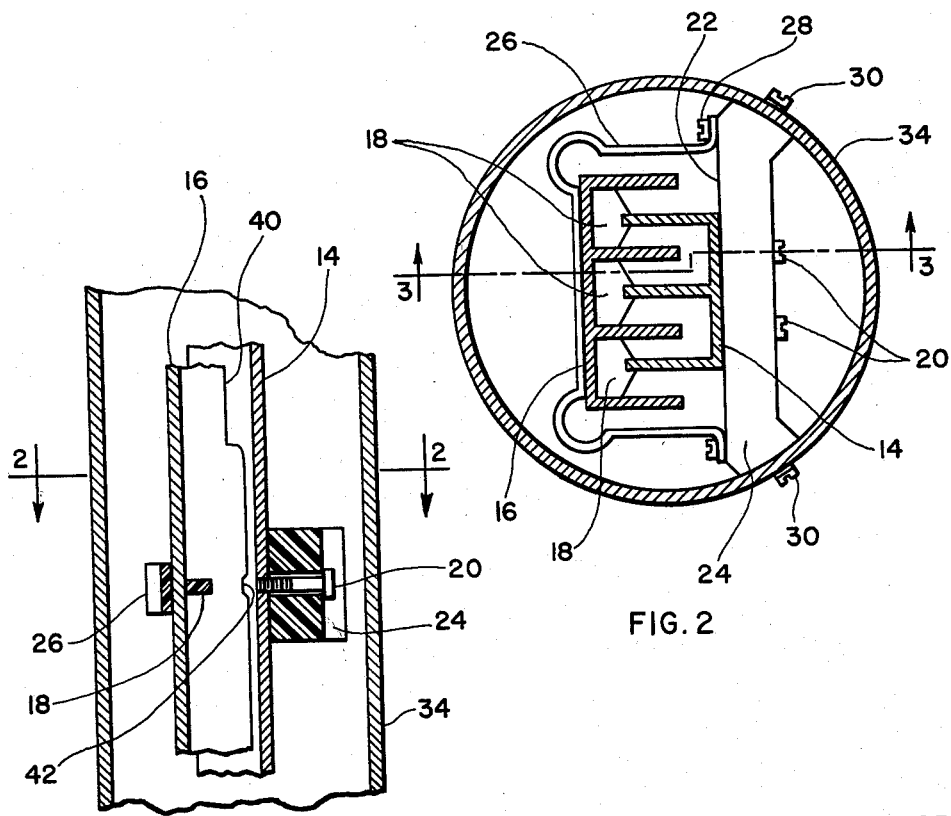
FIG. 2
FIG. 3
INVENTOR
BY PAUL J. GARDNER
ATTORNEY 3,103,815
LEVEL GAGES
Paul J. Gardner, Davenport, Iowa, assignor to The Bendix Corporation, Davenport, Iowa, a corporation of Delaware
Filed July 13, 1961, Ser. No. 123,808
4 Claims. (Cl. 73—304)

This invention relates to improvements in level gages and more particularly to capacitance level gages for use in measuring the level of liquids whose temperature differs materially from ambient temperature.

One object of the invention is to provide a capacitance level gage exhibiting minimum hysteresis as an incident to immersion and withdrawal from a liquid whose temperature is different, during immersion or withdrawal or both, from the temperature of the gage above the liquid level.

Another object is to provide an improved mounting arrangement for capacitance gages.

Other objects and advantages of the invention will hereinafter appear.

In the drawings:

FIG. 1 is a graph of the relation between capacitance of a gage and liquid level in different circumstances;

FIG. 2 is a cross-sectional view of the level gage embodying the invention, taken on line 2—2 of FIG. 3; and FIG. 3 is a cross-sectional view taken on the meandering line 3—3 of FIG. 2.

To illustrate the problem solved by the invention, let it be assumed that it is required to fill a vessel having the temperature of the ambient atmosphere with liquid hydrogen at minus 423 degrees Fahrenheit and then to withdraw the liquid, knowing at all times the level of the liquid within the vessel. Assume too that the level is to be determined with a capacitance gage extending over the depth of the vessel coupled with means for measuring the capacitance of the gage (or the effect of capacitance change). The dielectric constant of the liquid being materially greater than the vapors of the ullage space above the liquid, the capacitance of the gage will increase as liquid level increases.

Capacitance of the gage will also vary as the area and spacing of the gage electrodes are altered as an incident to temperature change. Such changes would present no problem in the design of a gage if they occurred nearly instantaneously or if the rate of filling and emptying of the vessel was much slower than the rate at which the temperature of the gage elements could be changed. In practice, however, successive increments along the length of the gage are cooled and contracted as the liquid level rises higher in the vessel. If the relative rate of gage cooling and vessel filling are such that sections of the gage length continue to contract after immersion in the liquid, then for a given filling rate the curve of capacitance of the gage plotted against liquid level might be like the dashed curve 10 in FIG. 1. When the vessel has been filled the gage elements will be cooled to substantially the temperature of the liquid hydrogen and will be completely contracted. On withdrawal of liquid from the vessel, sections along the length of the gage will not expand until after the level falls below them. Thus the capacitance of that gage segment which lies just below the gas-liquid interface will, at the time the liquid reaches any given level, be different during filling from its capacitance during emptying. The solid line 12 in FIG. 1 is a curve representing the relation between gage capacitance and liquid level during emptying.

The amount of the separation of these two curves is a measure of the amount of capacitance change incident to gage electrode area and spacing and of the extent to which these changes occur after the liquid has reached any given level. The latter is determined by the difference between cooling rate and filling rate—a factor termed "thermal lag" herein. It is an object of the invention to provide a gage in which these two curves more nearly coincide over a greater range of filling rates.

Gages made in accordance with the invention include, as features, elements which conduct heat readily whereby their cooling and contraction tends to occur above the gas-liquid interface during filling and they comprise means for decreasing the spacing between gage electrodes as the electrode areas decrease, where "electrode area" means the effective areas of the electrodes between which the electrostatic field extends.

The dielectric constant of the liquid being greater than the gas, the change in gage capacitance incident to electrode area and spacing change is less if these changes occur in gas than in liquid. Thus the problem is minimized by use of gage elements, including the mounting means along the gage length, which conducts heat readily. In addition, the mounting means is arranged so that most of its mass is divorced from the function of separating the gage electrodes.

Gage capacitance decreases as electrode area is decreased and it increases as electrode spacing is decreased. In gages made according to the invention the mounting means is arranged so that spacing is decreased rather than increased when the electrodes contract, and in one preferred form of the invention the mounting means effect relative movement of the electrodes in a direction tending to overcome reduction in their effective area incident to contraction.

These features are incorporated in the gage illustrated in FIGS. 1 and 2. This device comprises a pair of electrodes separated by spacers free to move with the electrodes and means to insure that the electrodes remain in engagement with the spacers as the electrodes and spacers change dimension with temperature. Means are included for mounting the electrodes such that dimensional changes with temperature of the mounting means does not alter electrode spacing. In the embodiment selected for illustration in FIGS. 2 and 3, one electrode has portions disposed within the cross-sectional area bounded, but not encompassed, by the other. Accordingly, as the electrodes and spacers contract, the electrode spacing is diminished and, whereas contraction of the electrodes reduces their effective area, this reduction is diminished by the amount of spacer contraction.

In FIGS. 2 and 3, the electrodes are numbered 14 and 16. Advantageously, as shown, they are formed of aluminum extrusions for high heat conductivity, and good dimensional uniformity. Electrode 14 comprises a backing plate rectangular in cross section and three similar ribs extending in parallel from one side of the plate, one at each edge and the third equidistant from and between the others. Electrode 16 is similar comprising a rectangular plate and four equally spaced sidewardly extending ribs. The basic dimensions and spacing of all ribs are the same in this example. The electrodes are arranged so that the three ribs of electrode 14 are disposed in the three spaces between the four ribs of electrode 16. The electrodes do not touch one another but are held apart by three small, thin spacers 18 which are notched at one end to receive the ends of the ribs of electrode 14 and abut against the backing plate and the roots of the ribs of electrode 16 at their opposite ends. Electrode 14 is secured by any convenient means, such as machine screws 20, to one side 22 of an electrically insulating mounting bar 24. A spring clip 26 holds electrode 16 tight against spacers 18 and the spacers tightly against the ribs of electrode 14. The spring clip 26 is fastened at its ends by any convenient means, such as screws 28, to side 22 of the mounting bar 24 from whence it extends along the sides of the end ribs of electrode 16 to the rear of the backing plate of electrode 26 where it bears against the backing plate. The assembly thus far described is disposed within an elongated still well 34 and is attached thereto by suitable fasteners 30 which extend through the well and into the mounting bar 24. The well is preferably formed of a good heat conductor such as aluminum tubing.

The still well serves as a means for mounting the gage in its vessel and it isolates the capacitor from other electrostatic fields within the vessel. It is connected electrically to ground. In addition, the still well is open at its lower end, perforated, or otherwise arranged, so that liquid flows into the well to the same level that it does in the vessel. Because of the well's relatively small diameter any turbulance or other movement of liquid at the gas-liquid interface is minimized and accuracy of the gage is improved.

The fact that electrical connection between the still well 34 and the outer electrode is permitted in cases where one capacitor electrode is grounded, permits mounting the spring clip 26 on the well 34 rather than on the mounting bar 24 if that is more convenient. Of course the spring however mounted may have any of a wide variety of shapes. The spring form shown is advantageous is very long gages because it presents no problem in inserting and assembling the gage into the well.

In operation of the gage shown, assuming that it is mounted in a vessel to be filled with a cryogenic liquid, as the level of liquid rises in the vessel and still well, heat is withdrawn rapidly from the still well and electrodes whereby contraction of successive sections of these elements tends to be completed prior to their immersion in liquid. As the liquid level approaches a mounting assembly, the mounting bar 24, fasteners 20, 28, and 30, the spring 26 and spacers 18 give up heat to the still well and electrodes. Except for the mounting bar 24, these elements and especially spacers 18, have very small mass and so are substantially fully cooled and contracted prior to immersion in the liquid even at relatively high filling rates. The spacers have good thermal contact with both electrodes. It is important that spacers 18 cool and contract rapidly so that spring 26 can urge the electrodes 14 and 16 together to their cold position prior to submersion in the liquid.

The mounting bar 24 has appreciable mass and accordingly is not so rapidly cooled and contracted. However, dimensional changes in the bar do not alter the electrode spacing or effective area so it is not material if contraction of the mounting bar is not complete until after immersion. This is true as well of the other mounting elements 26, 20, 28, and 30. Among the mouting elements expansion and contraction of the spacer elements alone are effective to control electrode spacing.

No problem is presented during withdrawal of the liquid from the container first because in most instances there is no substantial heat input to warm the gage and second because even if heat was available sections of the gage would not be warmed until after the liquid level had receded below them.

A wide variety of material is suitable for use in making the spacers and mounting bar. If, as in the particular embodiment shown, the spacer connects the still well and that one of the electrodes which must be insulated from the still well, then the bar, like the spacers, must be an electrical insulator. Many of the plastic materials are suitable. Advantageously the mounting bar is a relatively poor conductor of heat so that heat transfer from the bar to the electrode just prior to immersion of the portion of the electrode it contacts is limited. Once immersed most of its heat will be lost to the liquid rather than the electrode. Most plastics including triflorochloroethylene and tetrafluoroethylene are suitable.

The spacer material should give up its heat readily so that the spacers are cooled prior to immersion. In practice the mass of the spacers is small whereby they are easily cooled and material selection is not very critical. Trifluorochloroethylene and similar materials are recommended.

The combination of the spacers and electrode shape provide special advantages and permit the construction of precision gages in very long lengths. The electrode shape permits manufacture by extrusion and results in members having very uniform dimensions. In addition, the arrangement of backing member and ribs permits very accurate machining with conventional machine tools whereby the rib depth along the length of an element may be precisely contoured to change incremental capacitance lengthwise of the gage. Such contouring is desirable when the vessel in which it will be installed is not uniform throughout its length and its is desired that the capacitance of the gage vary as a predetermined function, such for example as linearly with liquid level or volume or mass of liquid. The spacers, 18 in the embodiment shown, engage the ends of the ribs of only one electrode so the ribs of the other electrode can be contoured without altering the mounting arrangement or the basic electrode relationship. Such contouring is illustrated at 40 and 42 in FIG. 3. The contour at 42 compensates for the slight increase in capacitance at this point resulting from the fact that the dielectric constant of the spacer is greater than unity.

I claim:

1. A capacitance level gage comprising a pair of elongated electrodes one being disposed partly within a cross sectional area between portions of the other electrode, a plurality of electrically insulating spacers disposed between said electrodes and having a dimension to limit the degree in which said one electrode may be partly disposed within said area, and mounting means for said electrodes including means for urging said electrodes into engagement with said spacers and for increasing the degree in which said one electrode is disposed within said area upon contraction of said spacers to reduce said dimension as an incident to temperature reduction.

2. A capacitance level gage comprising, a pair of elongated electrodes, one having a portion along its length extending partly within a cross sectional area between spaced portions of the other, at least one electrically insulating spacer interposed between said electrodes and limiting by its dimension the degree in which said one electrode may extend within said area, an elongated still well surrounding said electrodes, means for fixedly mounting either one of said electrodes to said still well, and resilient means interposed between said still well and that one of said electrodes not so fixedly mounted and bearing thereon in the direction of said dimension with a force sufficient to effect engagement of both electrodes with said spacer despite contraction and expansion of said electrodes and said spacer as an incident to temperature change.

3. The invention defined in claim 2 in which said still well is formed of aluminum and said electrodes are formed as extrusions of aluminum.

4. A capacitance level gage comprising an elongated still well and a pair of electrodes each having a backing plate and ribs extending therefrom, the ribs of a first one of said electrodes being disposed in the spaces between the ribs of the second one of said electrodes, and the electrodes thus arranged being disposed within the still well, mounting means for the electrodes comprising at least one electrically insulating spacer interposed between the backing plate of one of said electrodes and the ribs of the other of said electrodes and further comprising an electrically insulating mounting element secured between one of said electrodes and said still well and resilient means interposed between the other of said electrodes and the structure formed by the combination of the still well, mounting element and the one electrode, said resilient means urging said electrodes together in a direction and with a force sufficient to effect engagement of both of said electrodes with said spacer despite dimensional change of the electrodes and spacer in the direction of separation of the backing plate of said one of said electrodes and the ribs of said other of said electrodes incident to temperature change.

References Cited in the file of this patent

UNITED STATES PATENTS

| | | |
|---|---|---|
| 2,079,921 | Osnos | May 11, 1937 |
| 2,582,400 | Smith | Jan. 15, 1952 |
| 2,691,223 | Oberlin | Oct. 12, 1954 |